Aug. 30, 1955
C. C. BROWN
2,716,456
SELECTIVE SQUEEZE DEVICE
Filed Nov. 7, 1949
7 Sheets-Sheet 1
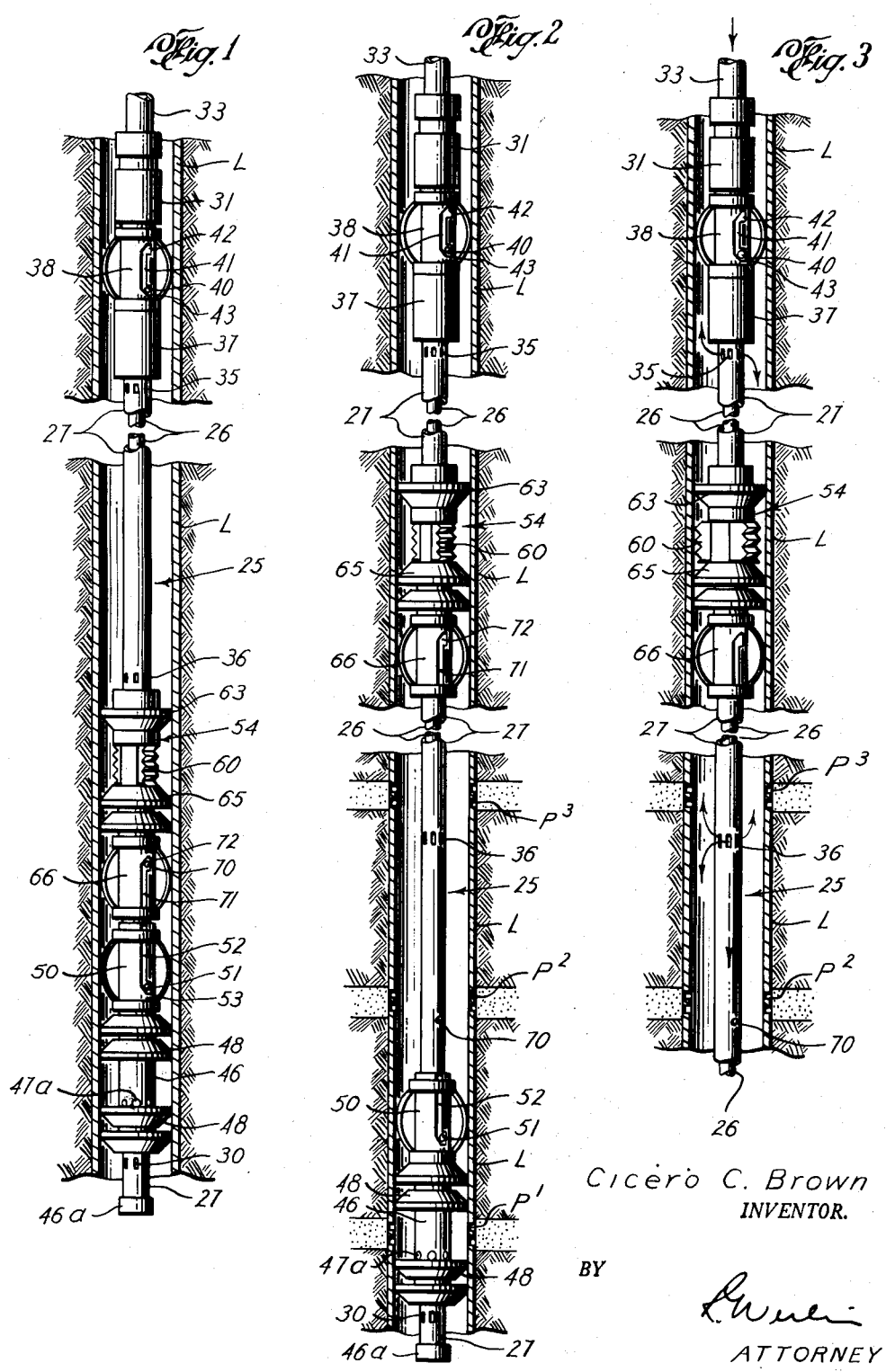
Cicero C. Brown
INVENTOR.
BY
ATTORNEY

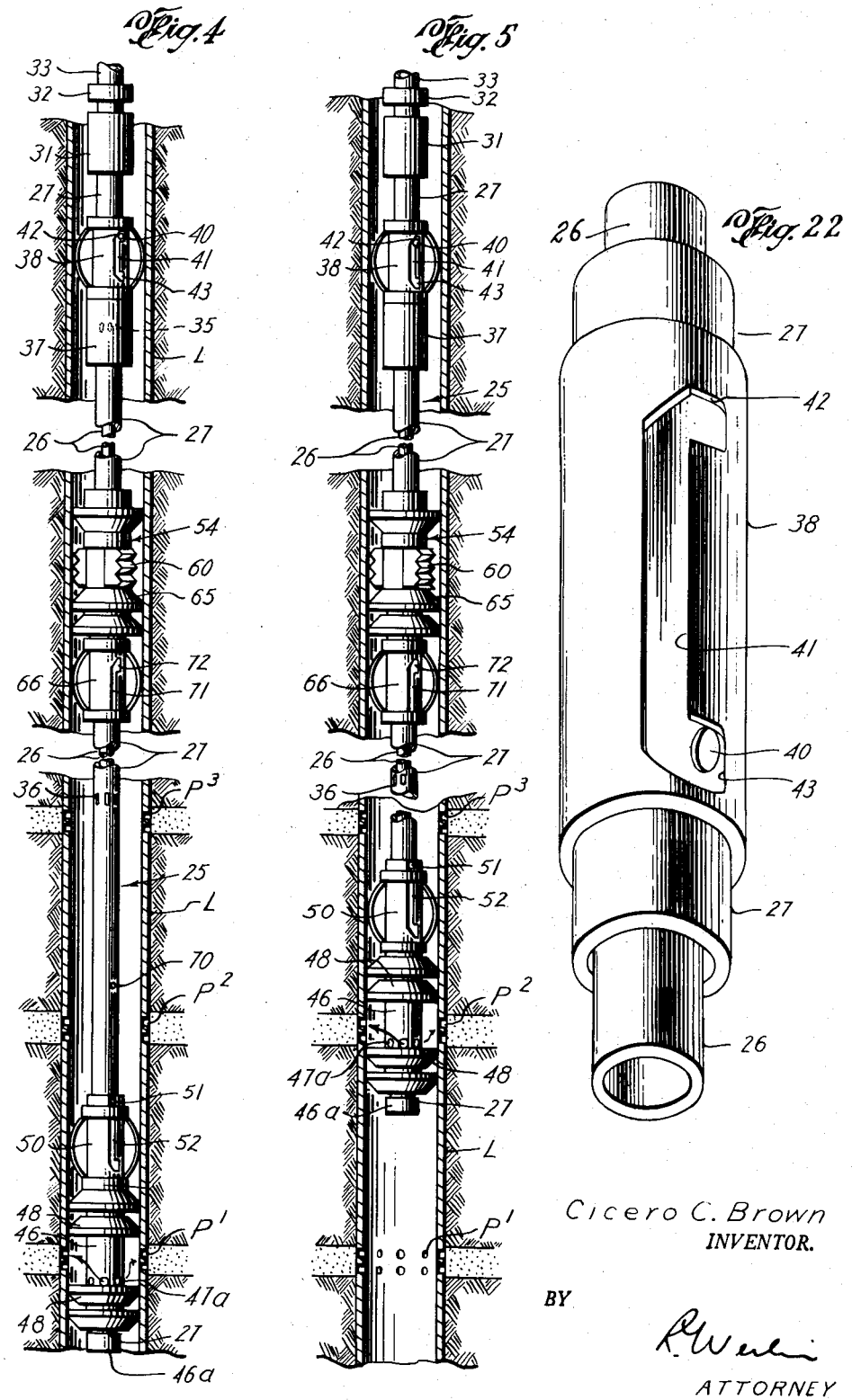

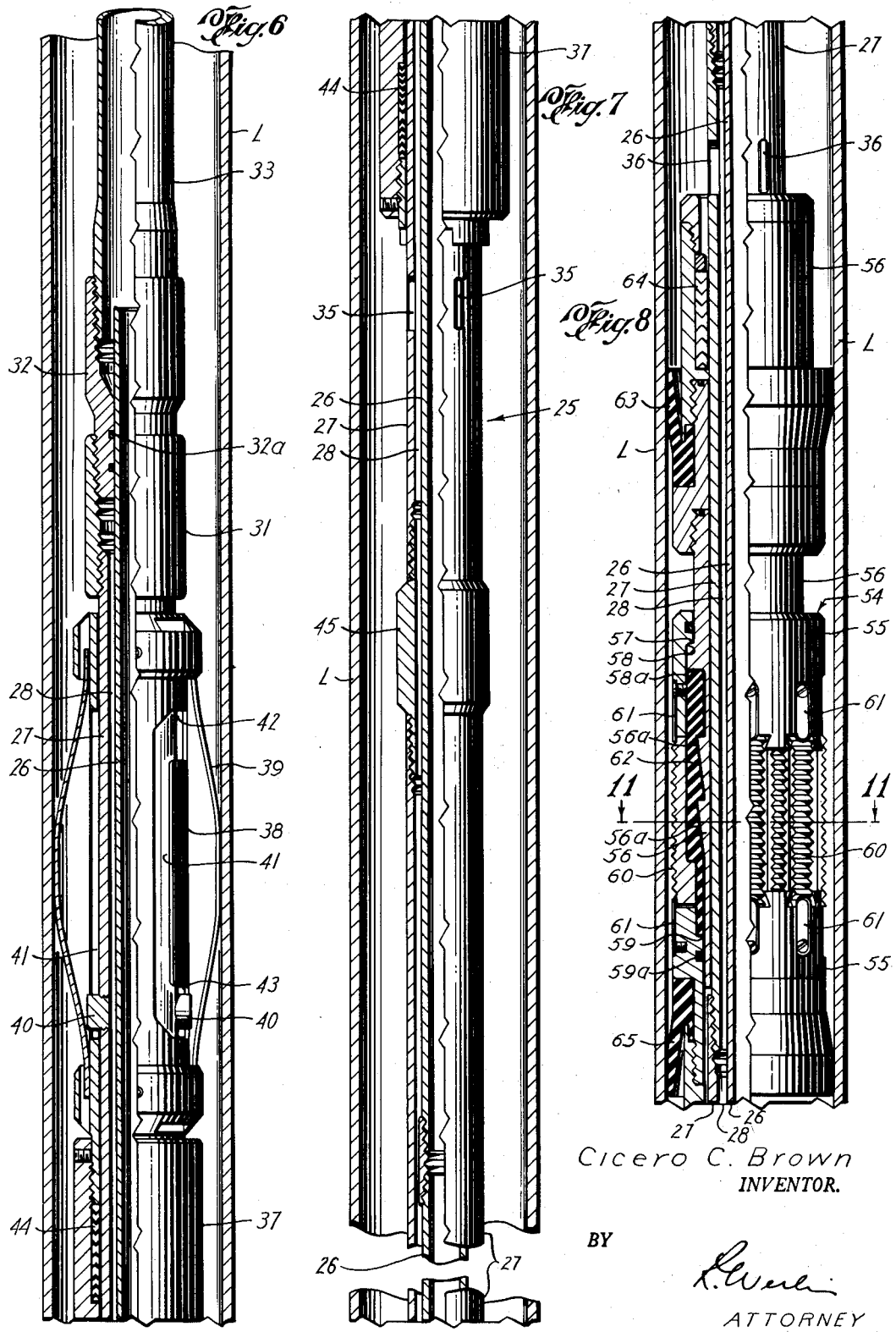

Aug. 30, 1955     C. C. BROWN     2,716,456
SELECTIVE SQUEEZE DEVICE
Filed Nov. 7, 1949     7 Sheets-Sheet 4
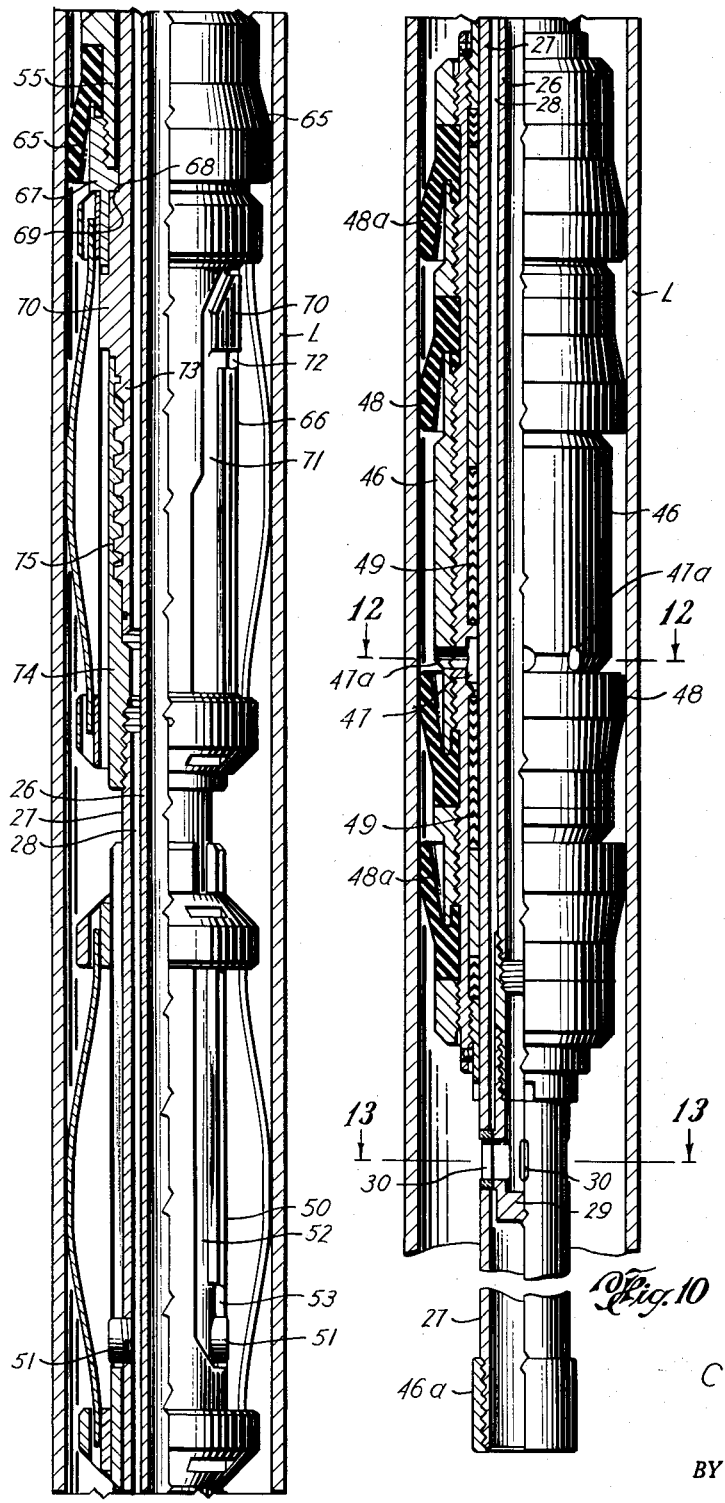
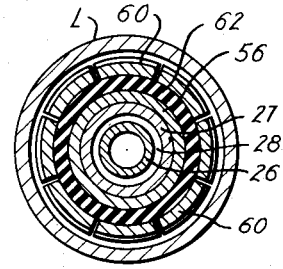
Fig. 11
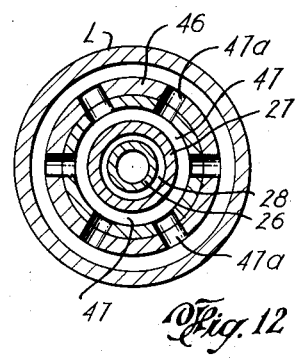
Fig. 12
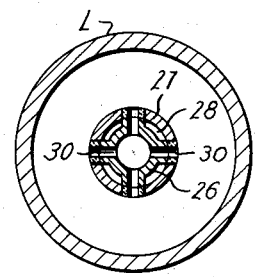
Fig. 13
Cicero C. Brown
INVENTOR.
BY
ATTORNEY

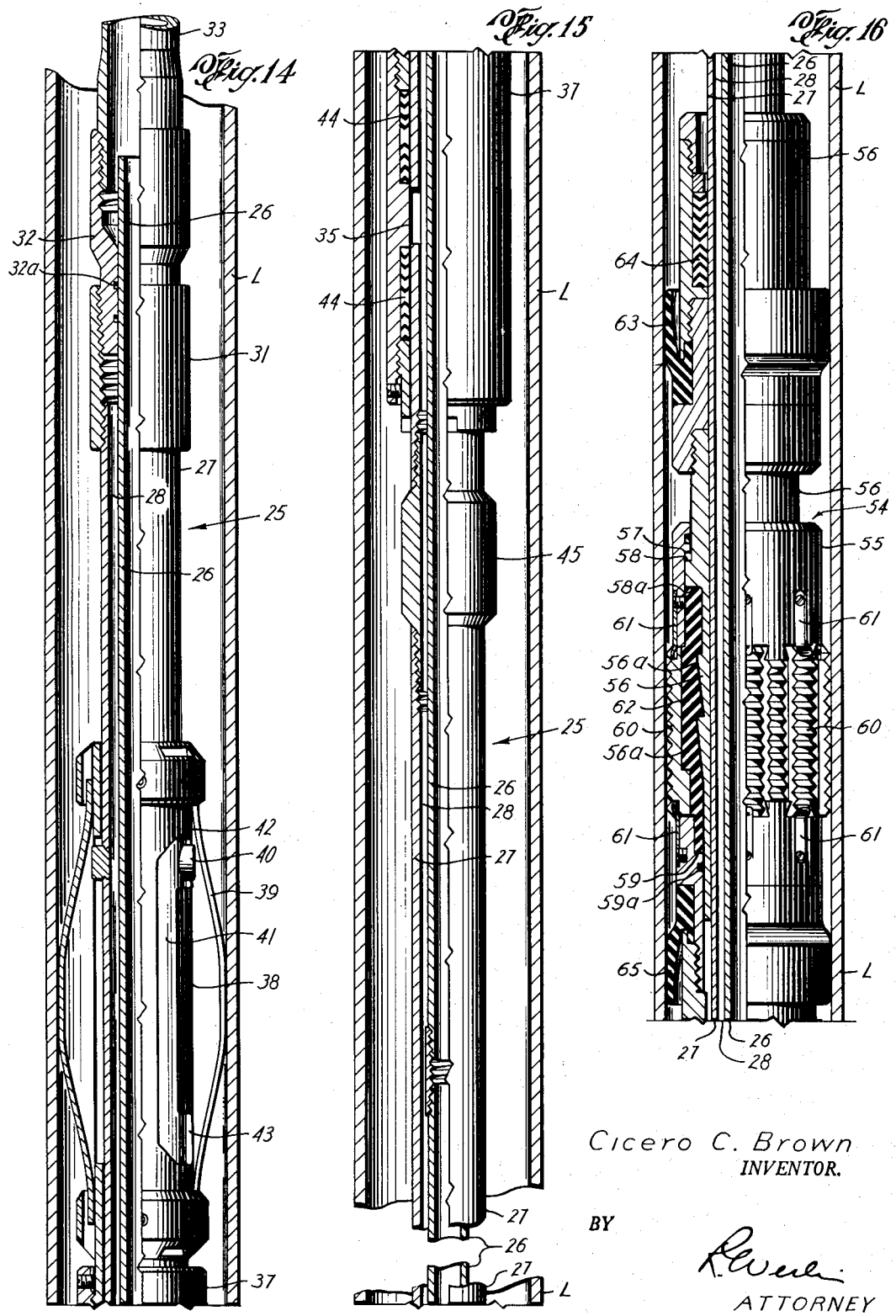

Aug. 30, 1955  C. C. BROWN  2,716,456
SELECTIVE SQUEEZE DEVICE
Filed Nov. 7, 1949  7 Sheets-Sheet 6
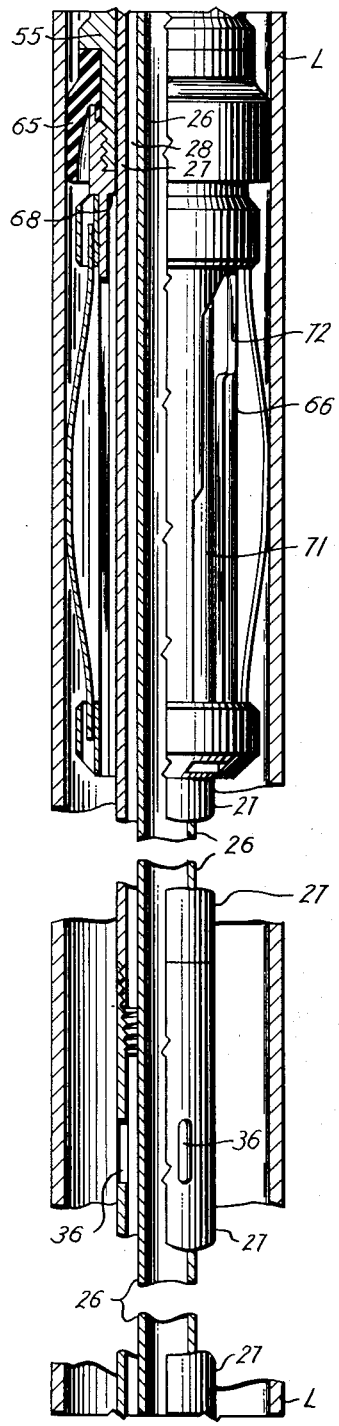
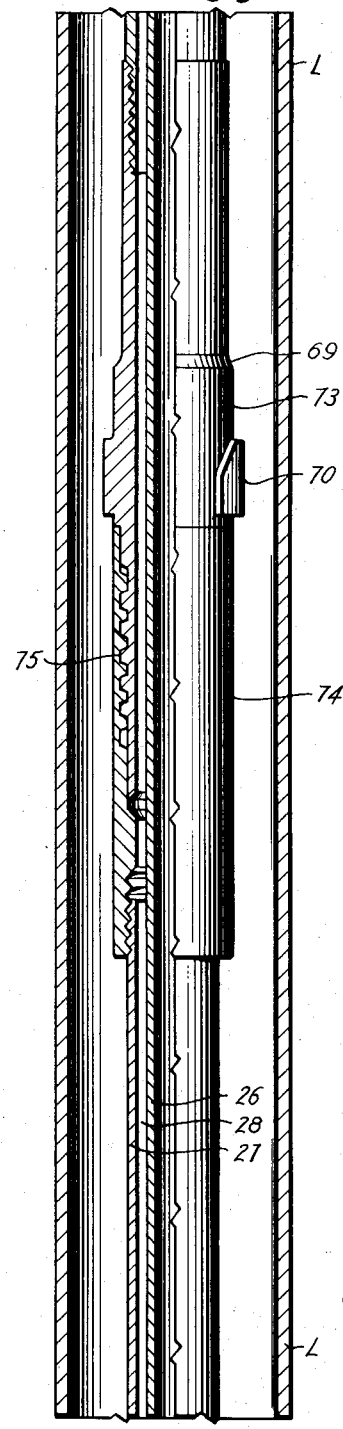
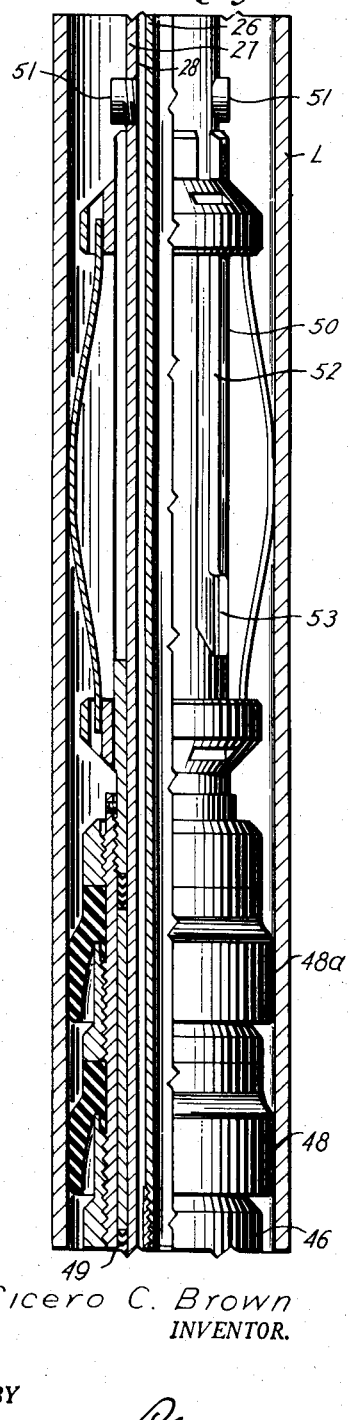
Cicero C. Brown
INVENTOR.
BY
ATTORNEY

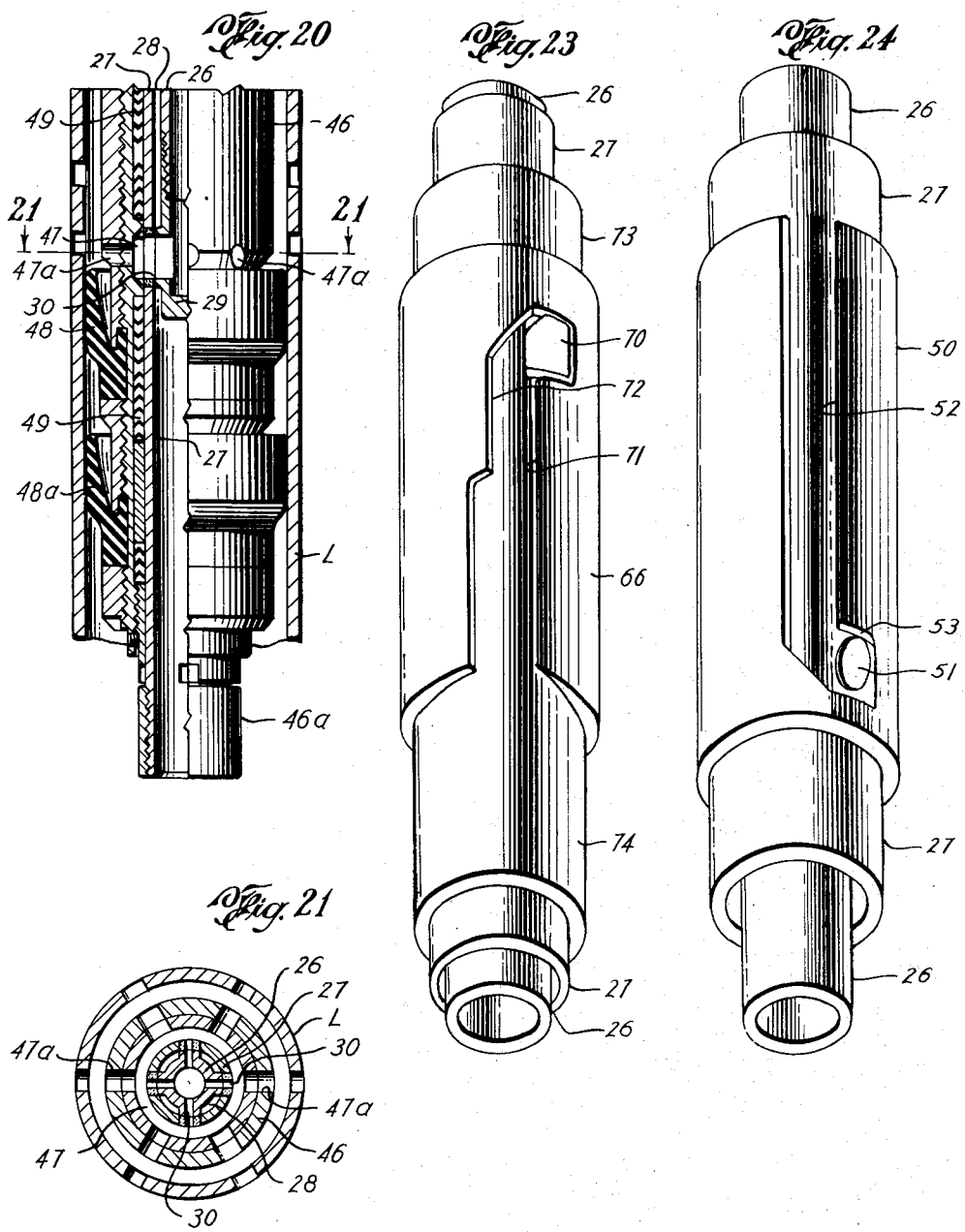

United States Patent Office 2,716,456
Patented Aug. 30, 1955

2,716,456

SELECTIVE SQUEEZE DEVICE

Cicero C. Brown, Houston, Tex.

Application November 7, 1949, Serial No. 125,989

11 Claims. (Cl. 166—119)

This invention relates to improvements in a squeeze device for use in oil and gas wells.

Squeeze devices are employed to inject various types of fluid under high pressures into earth formations traversed by the bore of a well such as an oil or gas well for various purposes. In some cases sealing fluids such as cement or plastic slurries are injected to seal off the formations from the well bore. In other cases acid or various types of detergent materials may be injected to dissolve or clean the formations to permit more copious flow of connate fluid from the formations into the well bore. In most cases, squeeze operations are performed inside a section of the casing liner which has previously been perforated along the portion extending through the formations to be treated to provide access to the well for the formation fluids. In many cases it may be necessary or desirable to close off the perforations at one or several different levels in the perforated section to enable the well to be brought in or to flow properly.

The present invention has for its principal objects the provision of an improved squeeze device which will permit performance of the squeezing operations on one or more selected sections of a well bore with a single run of the device in the well; which effectively segregates from other adjacent sections of the well bore the selected section into which fluid is to be injected; which may be employed to wash the sections of the well which have been subjected to the squeeze operations; which is comparatively simple in construction; and which may be operated in a relatively simple and easy manner.

Other and more specific objects and advantages of this invention will become apparent from the following detailed description when read in conjunction with the accompanying drawings which illustrate a useful embodiment of the device in accordance with this invention.

In the drawings:

Figs. 1, 2, 3, 4 and 5 illustrate the device in a well bore at several stages of operation and showing the relative positions of the principal parts thereof during the several stages;

Figs. 6 to 10, inclusive, taken together, constitute a longitudinal quarter-sectional view of the device wherein the several parts thereof occupy positions corresponding to the "running-in" or inoperative condition;

Fig. 11 is a cross-sectional view taken along line 11—11 of the portion of the device shown in Fig. 8;

Figs. 12 and 13 are cross-sectional views taken, respectively, along lines 12—12 and 13—13 of the portion of the device shown in Fig. 10;

Figs. 14 to 20, inclusive, taken together, constitute a view similar to Figs. 6 to 10, inclusive, but wherein the several parts occupy positions corresponding to the operative or squeeze condition;

Fig. 21 is a cross-sectional view taken along line 21—21 of the portion of the device shown in Fig. 20; and Figs. 22, 23 and 24 are enlarged perspective views better illustrating the details of some of the parts of the device.

Referring first to Figs. 6 to 13, inclusive, the device comprises an elongated tubular mandrel, indicated generally by the numeral 25, composed of a pair of concentrically arranged, inner and outer tubes 26 and 27, respectively, spaced apart by an annular chamber 28. The bore of inner tube 26 is closed at its lower end by a discharge spider comprising a closure 29 having a plurality of radial nozzles 30 which extend across the annular chamber 28 through the wall of outer tube 27 to provide communication between the bore of inner tube 26 and the exterior of outer tube 27. Nozzles 30 are welded or otherwise rigidly connected to outer tube 27 thereby connecting the inner and outer tubes into an integral unit, the spaces between the nozzles being in communication with annular chamber 28. (See Fig. 13.) As shown in Fig. 6, the upper end of outer tube 27 is made somewhat shorter than inner tube 26 and is screwed into a collar 31 through which the upper end of inner tube 26 extends. A swage nipple 32 is screwed into the upper end of collar 31 surrounding the extended end of inner tube 26, the bore of nipple 32 being provided with annular packing 32a forming a stuffing box between tubes 26 and 27 to seal the annular chamber 28 at its upper end. The upper end of swage nipple 32 is internally threaded for connection to the lower end of the usual string of operating tubing 33. By virtue of the above described arrangement of parts, it will be evident the fluid flowing down tubing 33 will be constrained to flow downwardly through the bore of inner tube 26 and thence through nozzles 30 to the exterior of outer tube 27.

Two series of radial ports 35 and 36 are provided through the wall of outer tube 27 to provide communication between annular chamber 28 and the exterior of the mandrel at longitudinally spaced points above nozzles 30. The upper series of ports 35 (Fig. 7) is located a relatively short distance below the upper end of the mandrel, while the lower series of ports 36 (Fig. 8) is located somewhat above the lower end of the mandrel. The distance between ports 35 and 36 may be made any suitable length depending upon the extent of movement desired for nozzles 30 axially of the well, as will be described hereinafter.

Ports 35 are adapted to be opened and closed by means of a tubular sleeve 37 slidable over the upper portion of the exterior of the mandrel adjacent ports 35. Ports 35 and sleeve 37 comprise an upper circulation valve for the device. The upper end of sleeve 37 is connected to a friction cage 38, of a generally conventional form, which is slidable on the exterior of the mandrel and fitted with the usual bow springs 39, or other conventional drag elements adapted to frictionally engage the usual liner L forming the wall of the well bore in which the device is run. By its frictional engagement with casing L, cage 38 is adapted to hold sleeve 37 stationary in the well bore while permitting mandrel 25 to engage in axial and rotative movements relative thereto. Mandrel 25 is releasably connected to cage 38 by a J-slot-and-pin connection composed of pins 40 projecting laterally from the exterior of mandrel 25 and cooperating longitudinal slots 41 in the wall of cage 38 into which pins 40 extend. Slots 41 are of the so-called "double-J" type (see Fig. 22), that is, one in which each end of the slot communicates with a lateral recess, both of which extend in the same direction, the upper recess being designated by the numeral 42 and the lower one by the numeral 43. In the normal "running-in" or inoperative position, pins 40 will be locked in lower recesses 43 to thereby hold sleeve 37 about ports 35. When this connection is released, as by clockwise rotation of mandrel 25 relative to cage 38, mandrel 25 may be raised relative to sleeve 37 whereby ports 37 will be drawn upwardly into the interior of sleeve 37 to close the ports. This movement will bring pins 40 opposite recesses 42 into which they will be locked by suitable counterclockwise movement of the mandrel, again locking the mandrel to the cage in this raised position (Fig. 14). The length of slots 41 will be suitably dimensioned relative to the position of ports 35 so that, upon completion of the raising movement of the mandrel, the ports will be enclosed by sleeve 37. Axially spaced annular packing elements 44 are provided in the interior of sleeve 37 to seal with the exterior of mandrel 25 on opposite sides of ports 35 when the latter have attained the desired position inside the sleeve (Fig. 15), to thereby prevent passage of fluid through ports 35 between the well bore and annular chamber 28. An enlargement 45 is provided on the exterior of the mandrel at a suitable distance below ports 35 to limit upward movement of mandrel 25 through sleeve 37 by contact with the lower end thereof in the event pins 40 should be accidently sheared off, which would otherwise permit ports 35 to move above packing elements 44.

Slidably mounted on the lower end of the mandrel is a tubular sleeve 46 having an internal annular channel 47 which is adapted to register with nozzles 30 when the mandrel is drawn upwardly inside sleeve 46 an appropriate distance. A plurality of radial ports 47a provide communication between channel 47 and the exterior of sleeve 46. Sleeve 46 and ports 47a comprise a sleeve valve which may be termed the "squeeze" valve or head of the device. A pair of annular cup-seals 48 are mounted on the exterior of sleeve valve 46 in axially spaced relation above the below ports 47a and are arranged so that their open mouths face toward each other. Cup-seals 48 are of the generally conventional type which are constructed of flexible resilient material such as natural or synthetic rubber or rubber composition, and are shaped and dimensioned to be expanded into fluid-tight sealing engagement with liner L by the application of fluid pressure against the interior surfaces of the cups. Additional cup-seals 48a may be mounted on sleeve 46, as shown particularly in Fig. 10, to assure greater sealing efficiency, if necessary, above and below ports 47a. Axially spaced annular packing elements 49 are provided in the interior of sleeve 46 above and below channel 47 to seal with the exterior of mandrel 25 to prevent leakage of fluid between the sleeve and the mandrel when nozzles 30 are in registration with the channel 47 and discharging fluid therethrough. The upper end of sleeve 46 is connected to a friction cage 50, of the same general form as cage 48, and which is adapted to frictionally engage liner L to hold sleeve 46 stationary while permitting relative rotational and axial movement of mandrel 25. Mandrel 25 is releasably connected to cage 50 by another conventional type of J-slot-and-pin connection composed of pins 51 projecting laterally from the exterior of mandrel 25 and cooperating longitudinal slots 52 in the wall of cage 50 into which pins 51 extend. Slots 52 have lateral locking recesses 53 at their lower ends, the recesses extending in the same direction relative to slots 52 as do recesses 42 and 43, described above. In the normal "running-in" or inoperative position pins 51 will be locked in recesses 53, thereby holding sleeve 46 above nozzles 30. When mandrel 25 is rotated in the clockwise direction to place pins 51 in registration with slots 52, the mandrel may be drawn upwardly relative to sleeve 46 to bring nozzles 30 in registration with channel 47. An external enlargement 46a, such as a conventional screw collar, is provided on the lower end of outer tube 27 to limit its upward movement through the bore of sleeve 46 to assure proper alignment of nozzles 30 with channel 47.

Slidably mounted on the exterior of mandrel 25 a short distance above sleeve 46 is a packer element, designated generally by the numeral 54, which is of the differential pressure type, several appropriate forms of which are described in my co-pending U. S. applications, Serial No. 100,224, filed June 20, 1949, now Patent No. 2,674,315, and Serial No. 116,252, filed September 17, 1949, now Patent No. 2,684,119, which are adapted to be set in a well bore and to form a seal therein primarily by means of end-wise compression applied to opposite ends of the packer, as by differential fluid pressure across the packer. In the illustrative form employed in the device in accordance with the present invention, packer element 54 is composed of a tubular body 55 into which is inserted a generally tubular expander 56 arranged for telescopic movement relative to body 55 and provided with one or more downwardly tapering conical enlargements 56a about its exterior. The upper end of body 55 is provided internally with a downwardly facing shoulder 57 adapted to engage an upwardly facing shoulder 58 arranged on the exterior of expander 56 to prevent retraction of the expander from body 55 while permitting axial movement of the expander within body 55 below shoulder 57. A downwardly facing shoulder 58a is provided on expander 56 slightly below shoulder 58. An upwardly facing shoulder 59 is provided in the interior of body 55 at a point spaced below shoulder 57. The lower end of expander 56 extends somewhat below shoulder 59 and a packing ring 59a is interposed between adjacent surfaces of expander 56 and the bore of body 55 below shoulder 59 to seal the annular space between these surfaces. A number of toothed wall-gripping slips 60 are mounted in the wall of body 55 between shoulders 58a and 59 and are arranged in any suitable manner for radial movement relative to the body. Slips 60 are held in the normally retracted position in the wall of body 55 by means of spring clips 61 extending from body 55 over the opposite ends of the slips. A generally tubular sleeve 62, constructed of rubber or other similar and suitable flexible resilient material, is arranged within body 55 between the exterior of expander 56 and the inner faces of slips 60, the ends of sleeve 62 being confined between shoulders 58a and 59. With this arrangement it will be seen that downward movement of expander 56 relative to body 55 will axially compress sleeve 62 between shoulders 58a and 59 and aided by conical surfaces 56a will produce radial expansion of the sleeve which will, in turn, urge slips 60 radially outwardly into gripping engagement with liner L. The greater the end-wise compression thus applied to sleeve 62, the greater will be the gripping force applied to slips 60. Relative retractive movement of expander 56 and body 55 will relieve the radial pressure on the slips and allow them to be released from engagement with liner L.

Mounted on expander 56 at a point spaced above body 55 is an upwardly facing conventional cup-seal 63, constructed of flexible resilient material, and shaped to be expanded by fluid pressure from above the cup-seal into sealing engagement with liner L above slips 60. Internal packing 64 is provided in the bore of expander 56 to form a fluid-tight seal between the expander and the exterior of mandrel 25. One or more similar cup-seals 65 are mounted on body 55 below slips 60 but face downwardly, thereby being expandible by upwardly directed fluid pressure into sealing engagement with liner L below slips 60. With this arrangement, it will be evident that when opposing pressures are applied to cup seals 63 and 65, expander 56 and body 55 will be urged toward each other thereby effecting the above-described outward movement of slips 60, while at the same time effectively sealing between the mandrel and wall of the well above and below slips 60.

A tubular friction cage 66, of more or less conventional construction, is connected to the lower end of body 55 by means of a collar 67 which is provided with an internal downwardly facing shoulder 68 engageable with an upwardly facing annular shoulder 69 formed on the exterior of outer tube 27 of the mandrel to thereby form a lower stop for the packer on outer tube 27. The latter is releasably connected to cage 66 by a third J-slot-and-pin connection composed of pins 70 projecting laterally from outer tube 27 and cooperating longitudinal slots 71 into which pins 70 extend. The upper ends of slots 71 communicate with lateral locking recesses 72 which extend in the same direction as recesses 42, 43 and 53 previously described. The lower ends of slots 71 are open. In the normal running-in or inoperative position pins 70 will be locked in recesses 72, thereby holding the packer element against relative longitudinal movement with respect to the mandrel to maintain slips 60 in their normally retracted position. When mandrel 25 is rotated in the clockwise direction to place pins 70 in registration with slots 71, the mandrel may be moved downwardly relative to cage 66 in order to perform the operation of setting the packer, as will be hereinafter described.

A safety joint, of generally conventional form, composed of a pin member 73 and a box member 74 connected by a coarse thread section 75, may be interposed in the portion of outer tube 27 which extends through cage 66. Pin member 73 is connected to the portion of outer tube 27 above the safety joint and box member 74 is connected to the portion of outer tube 27 below the safety joint. Locking pins 70 extend from the upper portion of pin member 73 above thread section 75. With this arrangement, it will be evident that should the lower end of the mandrel carrying squeeze valve 46 become stuck in the well, the portion of outer tube 27 above the safety joint may be unscrewed and withdrawn from the well over the inner tube and will carry with it packer element 54 and sleeve 37 and their connected cages, all of which elements are supported on outer tube 27. The inner tube and the lower end of the mandrel may then be fished out by conventional methods, thereby greatly simplifying the salvaging operation in the event the tool becomes stuck in the well.

The above-described device is operated in the following manner: Fig. 1 illustrates the device as it is run in the well, the several parts being shown in their running-in or inoperative positions, as also illustrated in greater detail in Figs. 6 to 10, inclusive. It will be noted that cage 38 connected to sleeve 37 and cage 50 connected to sleeve 46 are locked to mandrel 25 in raised positions relative to ports 35 and nozzles 30, respectively, leaving both these sets of openings uncovered. Cage 66 connected to packer element 54 is locked to mandrel 25 in which position ports 36 will be above the packer element and open to the well bore. As the tool is lowered in the well bore, which will normally be filled with drilling mud or well fluid, the fluid displaced by the tool as the tool moves down the well will be free to move upwardly through the open passages in the tool. The displaced fluid will enter through the open lower end of outer tube 27 passing upwardly through annular chamber 28 and emerge through ports 36 and 35 into the annular space between the tool and the liner L, thereby allowing the entire device to move freely down the well bore to the point at which it is to be set. The friction elements carried by the several friction cages will, of course, drag on the liner wall but since they are locked to the mandrel, the weight of the device will push them bodily downward through the liner.

The tool will ordinarily be lowered to a point in the liner at which packer element 54 will be above a zone in which the fluid injection or squeeze operations are to be performed. In this zone, which will generally extend through a series of earth strata into which fluid is to be injected, liner L will ordinarily be provided with a series of perforations, indicated at $P^1$, $P^2$ and $P^3$, to provide communication between the bore of the liner and the surrounding earth strata at several vertically spaced levels. The first operation will be to set packer element 54 to seal off the zone in which the squeeze operations are to be performed from the section of the well bore above this zone. This operation is effected by rotating tubing string 33 in the clockwise direction which will simultaneously place locking pins 40, 70, and 51 in registration with their respective slots 41, 71 and 52 to permit release of the mandrel for longitudinal movement relative to the other parts of the device. Tubing 33 will then be lowered, lowering mandrel 25. This lowering movement will produce downward movement of the mandrel relative to packer element 54 which will be held stationary by its friction cage 66, pins 70 traveling downwardly through and emerging from slots 71 which are open at their lower ends. During this movement no relative movement between the mandrel and cages 38 and 50 can occur because the drag of these cages and the downward movement of the mandrel will hold pins 40 and 51 against the bottoms of their respective slots 41 and 52. As a result, the downward movement of the mandrel which effects release of packer element 54 will be accompanied by downward movement bodily of cages 38 and 50 and their connected sleeves 37 and 46 without changing the relative positions of these sleeves on the mandrel. Ports 35 and nozzles 30 will still continue to remain uncovered while ports 36 will descend below the lower end of packer element 54, as shown particularly in Figs. 2 and 3. As soon as the mandrel is released from its engagement with sage 66, the friction of the latter on liner L will arrest further downward movement of body 55 of the packer element. This resistance will be supplemented by the back pressure of fluid trapped in the well bore below the packer element acting upwardly on cup-seals 65, this back pressure being created by the restriction provided by annular chamber 28 to the passage of well fluid therethrough and out of ports 35 (Fig. 3). At the same time, the head of fluid in the well bore above the packer element will act downwardly on cup-seals 63 and tend to force expander 56 downwardly relative to packer body 55. These opposing pressures will, therefore, produce axial compression of sleeve 62 which will drive slips 60 outwardly into gripping engagement with liner L. At the same time, the opposing pressures acting on cup seals 63 and 65 will expand these in tight sealing engagement with liner L while inner packing 64 and 59a at the opposite ends of packer element 54 will prevent escape of well fluid through the bore of the packer element along the exterior of the mandrel. In this way the zone below the packer element in which the squeeze operations will be performed may be effectively sealed from the section of the well bore above the squeeze zone, when the upper circulation valve is closed as will be described hereinafter.

Setting of the packer element in the manner described will occur almost instantaneously upon release of pins 70 from recesses 72. Lowering of mandrel 25, carrying upper and lower cages 38 and 50, respectively, and their connected sleeves 37 and 46 in their initial positions, may then be continued until the lower end carrying sleeve 46 is opposite the portion of the perforated section of the liner in which initial squeeze operations are performed. By way of example, it will be assumed that initial squeeze operations are to be performed on the lowermost group of perforations $P^1$. Accordingly, the mandrel will be lowered through packer element 54 until the portion of sleeve 46 carrying ports 47a will be opposite perforations $P^1$, as illustrated particularly in Fig. 2. It will be understood however, that the longitudinal position of the mandrel may be adjusted to place the perforate portion of sleeve 46 opposite any other desired level in the zone sealed off by packer element 54. As noted previously, the portion of the mandrel extending between ports 35 and 36 may be made to any length which may be required to enable the fluid injection end of the tool to reach any desired level in the squeeze zone.

When sleeve 46 has been placed oppostie perforations $P^1$, pumping of the injection fluid into the upper end of tubing 33 may be begun, this fluid being pumped in on top of the column of mud or other well fluid which is present inside the tubing string, and may be followed by other displacing fluid, if necessary, the volumes of injection and displacing fluids being calculated in the well known manner to effect displacement of the underlying column of mud or well fluid from the interior of the tubing and inner tube 26 of the mandrel in order that the injection fluid may be brought into position for injection through perforations P¹ into the surrounding formations.

As the injection fluid moves downwardly, the mud or other fluid being displaced thereby will be forced out of nozzles 30 into the well bore below sleeve 46 and the major portion of this displaced fluid will flow downwardly and into the open lower end of outer tube 27, thence upwardly through annular chamber 28 where it eventually emerges through ports 35 into the well bore above packer element 54. Some of this fluid will emerge through ports 36 and will fill the section of the well bore below packer element 54 and above sleeve 46 which will continue to be sealed against upward movement of this fluid by packer element 54. (See Fig. 3.) It will be evident, therefore, that annular chamber 28 forms a by-pass passageway around the sealed sleeve 46 to provide communication between the portions of the well bore below sleeve 46 and those above the sleeve and above packer element 54.

As soon as the lower end of the slug of injection fluid has descended in inner tube 26 to a point adjacent nozzles 30, as will be determined from the volumetric calculations previously made or by suitable signalling arrangements commonly practiced in this art, the tubing string will be raised to raise mandrel 25 sufficiently to draw nozzles 30 inside sleeve 46 and into registration with channel 47. At the same time, ports 35 will be drawn upwardly inside sleeve 37 closing these ports against movement of fluid therethrough, friction cages 38 and 50 being held stationary to permit this relative movement of mandrel 25. When nozzles 30 are thus placed in registration with channel 47, the injection fluid inside inner tube 26 will begin discharging through ports 47a into the portion of the well bore confined between cup seals 48—48 and opposite perforations P¹. This fluid injection position of the parts of the device is illustrated in Fig. 4 and in greater detail in Figs. 14 to 21, inclusive. The section of the well bore containing perforations P¹ will be sealed off on each side by cup seals 48—48 and this section will thereby be completely segregated from the remainder of the zone below packer element 54. The pressure applied to the emerging injection fluid will act against the inner surfaces of seal cups 48—48, which face toward each other, to increase the tightness with which they seal off the selected section. As much pressure as may be desired may, therefore, be applied to the injection fluid to force it through perforations P¹ and "squeeze" it into the immediately surrounding earth formations. It will be understood that the spacing between seal cups 48—48 may be made of any desired length to include a corresponding section of the well bore and may be made as wide or as narrow as may be desired within practical limits.

When the squeeze operation through perforations P¹ is completed, the mandrel may be raised to bring sleeve 46 opposite the next higher section, such as that including perforations P², as illustrated in Fig. 5. This change in position will be accomplished merely by raising tubing string 33 an appropriate distance. Packer element 54 will not be affected as the mandrel will simply move upwardly therethrough. Cage 38 will move upwardly, as pins 40 will be bearing against the upper end of slot 41 and ports 35 will, therefore, remain closed by sleeve 37. Also, the lower end of sleeve 46 will be resting on enlargement 46a and cage 50 will similarly move upwardly with the mandrel. This upward movement of the mandrel is effected without difficulty by reason of the provision of the by-pass passageway around sleeve 46 formed by annular chamber 28 and ports 36. As the mandrel moves upwardly, fluid trapped in the well bore between sleeve 46 and packer element 54 may flow through ports 36 and annular chamber 28 to the portions of the well bore below sleeve 46, thus equalizing the pressure above and below sleeve 46.

When sleeve 46 has thus been brought opposite the liner section containing perforations P², the previously described fluid injection steps may be repeated. Any number of sections in the squeeze zone below packer element 54 may thus be selectively treated, each section being selectively segregated from the remainder of the squeeze in the manner described.

By means of the device in accordance with this invention, any section of the squeeze zone below packer element 54 may also be washed to remove excess injection fluid or for any other desired purpose. For example, if the section containing perforations P¹ is to be washed after squeezing, the mandrel will be raised through packer element 54 in the manner previously described to raise sleeve 46 above this section. The mandrel will then be be lowered, and also rotated clockwise to release pins 40 from recesses 42 and to re-align pins 51 with slots 52. These movements will produce relative movement between the mandrel and cages 38 and 50 which will be held stationary by their drag on liner L. As a result, ports 35 will again descend below sleeve 37 and nozzles 30 below the lower end of sleeve 46, to positions corresponding substantially to those illustrated in Fig. 2. This will open the by-pass passageway formed by annular chamber 28 between the well bore section below sleeve 46 and above packer element 54. Washing fluid pumped downwardly through inner tube 26 will then discharge through nozzles 30 into the well bore section below sleeve 46 which is to be washed, and thence upwardly through the open lower end of outer tube 27, through annular chamber 28 to ports 35 and out into the well bore above packer element 54. Circulation of washing fluid may be continued in this manner until washing is completed, whereupon the mandrel may be again raised to close ports 35 and draw nozzles 30 into sleeve 46 in preparation for movement to a new injection position.

The device may also be used for selectively testing various formations in a strata section for production possibilities, or the character of fluid flowing in from the various portions of the section. In order to test a selected portion of the strata, the device will be run in and set in the same manner as previously described for squeezing that portion. Then, instead of injecting a squeeze fluid, any fluid inside inner tube 26 may be removed, as by swabbing in the usual manner, until the head inside the tube is lowered sufficiently to permit formation fluid to flow out of the earth formation between cup seals 48—48 and through ports 47a and nozzles 30 into the interior of the tube and thence to the surface, where the nature of the formation fluid may be determined. In cases where the well has been perforated in both an oil formation and a water-containing formation, for example, it is possible by means of this device to selectively test the several portions to determine which produce water and which oil. Having thus determined the water-producing formation, this portion may be selectively squeezed-off with cement in the manner described herein in order to shut-off the water producing strata and permit the well to produce water-free oil. Many other similar operations may be successfully performed with this device without removing the device from the well and while maintaining the zone in which the several operations are performed effectively segregated from the portion of the well bore above the zone of these operations.

To remove the device from the well, the device will be operated to return the parts to the positions illustrated in Fig. 2 in which ports 35 and nozzles 30 are both open to the well bore. The string will be rotated in the counter-clockwise direction, locking pins 40 and 51 in their respective recesses 43 and 53. Counter clockwise rotation is continued until pins 70 are aligned with slots 71 and the string is then raised to draw pins 70 up into slots 71 until they strike the upper ends of slots 71 whereupon continued upward pull of the operating string will produce retractive movement between body 55 and expander 56. This will allow sleeve 62 to retract and relieve the radial pressure thereof on slips 60 which may then be pulled loose from the wall of the well. Jarring action may be effected between pins 70 and the upper end of slots 71 by moving the string upwardly at sufficiently high speeds to produce jarring impacts between pins 70 and the upper ends of slots 71, if desired or necessary to pull the slips loose. When pins 70 have been thus drawn into the upper end of slots 71, ports 36 will have ascended to their initial position above the upper end of the packer element, as illustrated particularly in Figs. 1 and 8, thereby again opening communication between the portions of the well bore above and below the packer element, and the entire device may then be readily withdrawn from the well.

It will be understood that numerous alterations and changes may be made in the details and arrangement of parts of the illustrative embodiment within the scope of the appended claims but without departing from the spirit of this invention.

What I claim and desire to secure by Letters Patent is:

1. A selective squeeze device, comprising, a tubular packer member insertible in a well bore and adapted to engage the bore wall and seal off the well bore, a tubular mandrel movable axially through the bore of said packer member, packing means between said mandrel and said packer member, said mandrel embodying annularly spaced concentric inner and outer tubular members providing an annular chamber between said tubular members which is open at its lower end, means closing the upper end of said chamber, the lower end of said outer member having radial passageways communicating with the exterior thereof, said inner tubular member being closed at its lower end and having radial discharge nozzles connected to said passageways for providing communication between the bore of the inner tubular member and the exterior of the outer tubular member, sleeve means slidable on said outer tubular member below said packer member and having openings therein movable into and out of registration with said nozzles in response to relative axial movement between said sleeve means and said mandrel, annular sealing means mounted on said sleeve means in axially spaced relation on opposite sides of said openings adapted to form fluid-tight seals with the wall of said well bore, a first port in the upper portion of said outer tubular member at all times above said packer member, other ports in an intermediate portion of said outer tubular member above said sleeve means adapted to be moved between positions above and below said packer member in response to relative axial movement between said mandrel and said packer member, and releasable latch means connecting said mandrel to said packer member adapted when engaged to hold said other ports above said packer member and when released to permit said other ports to be moved below said packer member.

2. A selective squeeze device according to claim 1 having a closure sleeve slidably mounted on said outer tubular member adjacent said first port for opening and closing said first port in response to longitudinal movement of said mandrel relative to said closure sleeve, said closure sleeve having bore wall engaging members connected thereto to hold said closure sleeve stationary in the well bore to permit relative rotational and longitudinal movement of said mandrel.

3. A selective squeeze device according to claim 1, wherein said sleeve means has bore wall engaging members connected thereto to hold said sleeve means stationary in the well bore to permit relative rotational and longitudinal movement of said mandrel.

4. A selective squeeze device, comprising, a hollow packer member insertible in a well bore and adapted to engage the bore wall to seal off the well bore, a tubular mandrel movable axially through said packer member, a squeeze head comprising a sleeve member slidable on the portion of the mandrel below the packer member, longitudinally spaced circumferential sealing elements on the exterior of said sleeve member engageable with the bore wall to seal off a section of the well bore within the portion thereof below the packer member, radial passages in said sleeve member between said sealing elements, ports in the lower portion of said mandrel movable into and out of registration with said passages by longitudinal movement of the mandrel relative to said sleeve member to control communication between the interior of the mandrel and said section of the well bore, and a by-pass passageway in said mandrel opening outwardly into the portions of the well bore above the packer member and below the squeeze head.

5. A selective squeeze device according to claim 4, having sleeve valve means slidably mounted on said mandrel above said packer member and engageable with the wall of the well bore whereby to be actuatable by relative axial movement of the mandrel for selectively opening and closing the upper end of said by-pass passageway.

6. A selective squeeze device according to claim 4, having openings intermediate the ends of said by-pass passageway positionable above and below said packer member by longitudinal movement of said mandrel relative to said packer member.

7. A selective squeeze device according to claim 4, having sleeve valve means slidably mounted on said mandrel above said packer member engageable with the wall of the well bore whereby to be actuatable by relative axial movement of the mandrel for selectively opening and closing the upper end of said by-pass passageway, and openings intermediate the ends of said by-pass passageway positionable above and below said packer member by longitudinal movement of said mandrel relative to said packer member.

8. A selective squeeze device according to claim 4, having sleeve valve means slidable on said mandrel above said packer member and actuatable by relative longitudinal movement of said mandrel to open and close the upper end of said by-pass passageway.

9. A selective squeeze device, comprising, a tubular packer member insertible in a well bore and adapted to form a seal therein, a tubular mandrel having radial openings at its lower end movable axially through the bore of said packer member for selectively positioning said openings opposite a portion of the well bore below said packer member, a well bore sealing member comprising a sleeve member movably mounted on said mandrel below the packer member adjacent said openings, said sleeve member having longitudinally spaced circumferential sealing elements engaging the bore wall to seal off said portion from the remainder of the well bore and adapted to constrain fluid movement between said openings and said portion of the well bore, discharge passages in the sleeve member between said sealing elements adapted to communicate with said openings, a by-pass passageway extending longitudinally in said mandrel and having ports at its opposite ends above said packer member and below said sealing member to provide communication between the portions of said well bore below said sealing member and above said packer member, and having intermediate ports movable into and out of communication with the portion of the well bore between said packer member and said sealing member by axial movement of said mandrel relative to said packer member.

10. A selective squeeze device, comprising, a tubular packer member insertible in a well bore and adapted to form a seal therein, a tubular mandrel having radial openings at its lower end movable axially through the bore of said packer member for selectively positioning said openings opposite a portion of the well bore below said packer member, a well bore sealing member comprising a sleeve member movably mounted on said mandrel below the packer member adjacent said openings, said sleeve member having longitudinally spaced circumferential sealing elements engaging the bore wall to seal off said portion from the remainder of the well bore and adapted to constrain fluid movement between said openings and said portion of the well bore, discharge passages in said sleeve member between said sealing elements adapted to communicate with said openings, a by-pass passageway extending longitudinally in said mandrel and having ports at its opposite ends above said packer member and below said sealing member providing communication between the portions of the well bore below said sealing member and above said packer member, and having intermediate ports movable into and out of communication with the portion of the well bore between said packer member and said sealing member by axial movement of said mandrel relative to said packer member, and sleeve valve means sldable on the mandrel to open and close the ports at the upper end of said passageway whereby to control fluid circulation through said by-pass passageway.

11. A selective squeeze device, comprising, a tubular packer member insertible in a well bore and adapted to form a seal therein, a tubular mandrel having radial openings at its lower end movable axially through the bore of said packer member for selectively positioning said openings opposite a portion of the well bore below said packer member, a releasable connection between said packer member and said mandrel, a well bore sealing member comprising a sleeve member movably mounted on the mandrel below the packer member adjacent said openings, said sleeve member having longitudinally spaced circumferential sealing elements engaging the bore wall to seal off said portion from the remainder of the well bore and adapted to constrain fluid movement between said openings and said portion of the well bore, discharge passages in the sleeve member between said sealing elements adapted to communicate with said openings, a by-pass passageway extending longitudinally in said mandrel and having ports at its opposite ends above said packer member and below said sealing member to provide communication between the portion of the well bore below said sealing member and above said packer member, and having intermediate ports movable into and out of communication with the portions of the well bore between said packer member and said sealing member by axial movement of said mandrel relative to said packer member.

References Cited in the file of this patent

UNITED STATES PATENTS

| | | |
|---|---|---|
| 2,360,311 | Ausburn et al. | Oct. 17, 1944 |
| 2,384,192 | Otis et al. | Sept. 4, 1945 |
| 2,404,876 | Granger | July 30, 1946 |
| 2,416,842 | O'Leary | Mar. 4, 1947 |
| 2,426,164 | Breukelman | Aug. 26, 1947 |
| 2,433,828 | Cassell | Jan. 6, 1948 |
| 2,575,603 | Taylor et al. | Nov. 20, 1951 |
| 2,674,315 | Brown | Apr. 6, 1954 |
| 2,684,119 | Brown | July 20, 1954 |